No. 832,006. PATENTED SEPT. 25, 1906.
F. E. BAKER.
TRUCK FOR TRANSFERRING MAIL MATTER.
APPLICATION FILED JAN. 30, 1905.
2 SHEETS—SHEET 1.
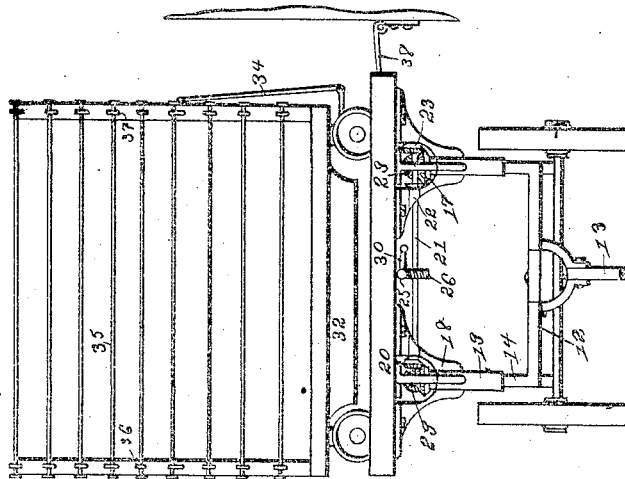
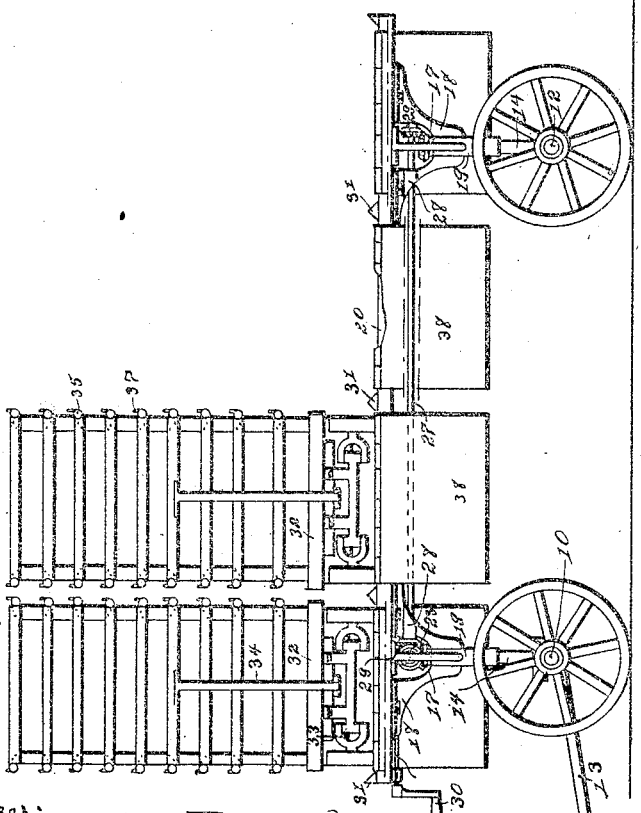
Witnesses:
L. L. Leibrock
R. H. Orwig
Inventor: Frank E. Baker,
By Thomas G. Orwig, Attorney.

No. 832,006. PATENTED SEPT. 25, 1906.
F. E. BAKER.
TRUCK FOR TRANSFERRING MAIL MATTER.
APPLICATION FILED JAN. 30, 1905.
2 SHEETS—SHEET 2.
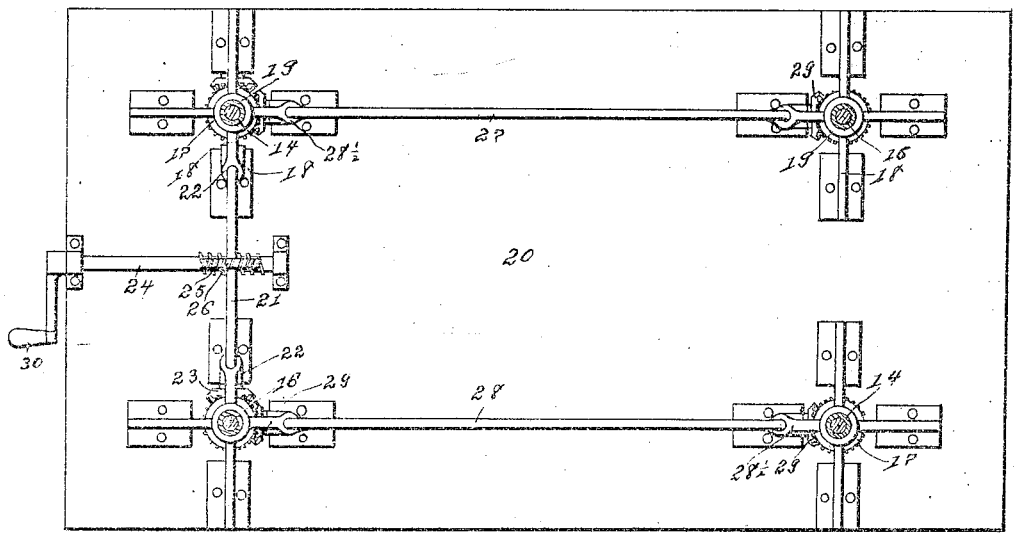
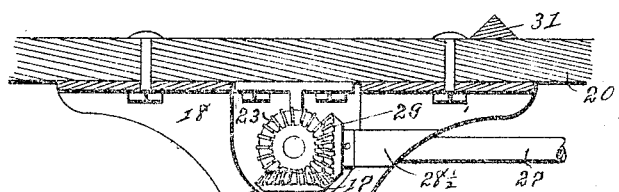
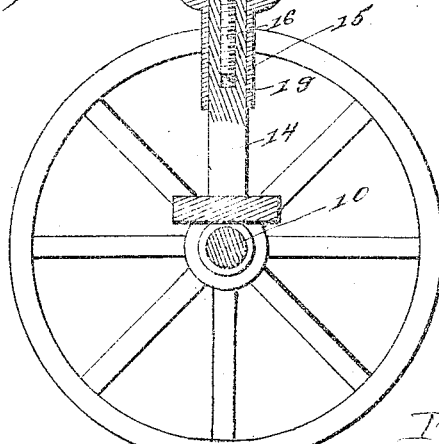
Witnesses:
L. L. Leiback
Q. H. Orwig
Inventor:
Frank E. Baker,
By Thomas G. Orwig Attorney.

UNITED STATES PATENT OFFICE.

FRANK E. BAKER, OF OSKALOOSA, IOWA.

TRUCK FOR TRANSFERRING MAIL-MATTER.

No. 832,006.　　　Specification of Letters Patent.　　　Patented Sept. 25, 1906.

Application filed January 30, 1905. Serial No. 243,450.

*To all whom it may concern:*

Be it known that I, FRANK E. BAKER, a citizen of the United States, residing at Oskaloosa, in the county of Mahaska and State of Iowa, have invented a new and useful Truck for Transferring Mail-Matter to and from Railway-Cars, of which the following is a specification.

My object is to facilitate the transfer of mail-matter and baggage to and from railway-cars and diminish the manual labor required in handling mail-bags and other articles that can be placed in a movable truck.

My invention consists in the apparatus hereinafter set forth, pointed out in my claims, and illustrated in the accompanying drawings, in which—

Figure 1 is a side elevation of a movable truck and mechanism for raising and lowering the platform relative to the floor of a railroad-car. It also shows end views of a smaller truck adapted to be moved in and out of a mail or baggage car, as required for transferring their contents to and from a car. Fig. 2 is a front view of the main truck in position as required to be connected with a car or a track. Fig. 3 is a bottom view of the main truck and shows the construction and application of mechanism for raising and lowering the platform relative to the truck-wheels. Fig. 4 is an enlarged sectional view of the means for raising and lowering the platform and the manner of combining it with a truck-axle and the corner of the platform.

The numeral 10 designates the front axle, and 12 the rear axle, mounted on truck-wheels. A pole 13 is connected with the front axle to be used in manually moving the truck. Standards 14 are fixed to the end portions of the axles and provided with internal screws 15 in their top portions, as shown in Fig. 4. A screw 16 is fitted in the internal screw 15 and a bevel-gear 17 fixed to its top. A frame 18, adapted to be fixed to the under side of a platform, is provided with a sleeve 19, adapted to be placed on the tubular standard 14 in such a manner that the frame 18 can be raised and lowered by rotating the screw 16.

Each corner portion of the platform 20 has a frame 18 fixed thereto, as shown in Fig. 3, or in any suitable manner, as required for placing the sleeves 19 on the tubular standards 14.

To simultaneously rotate the four screws 16 in the internal screws 15 in the standards 14, a shaft 21 is mounted in bearings 22, as shown in the front end of Fig. 3, or in any suitable way, as required for engaging bevel gear-wheels 23 with bevel gear-wheels 17 on the ends of the screws 16, so that the shaft and bevel-gears can be operated by a rotatable shaft 24, mounted in bearings, as shown in Fig. 3, and provided with a fixed worm 25 to engage a gear-wheel 26 on the shaft 21. To transmit power and motion from the shaft 21 to the bevel-gears at the rear of the platform, as required to actuate the screws 16 in the tubular standards 14, shafts 27 and 28 are mounted in bearing 28½, as shown, or in any suitable way, and bevel-gears 29, fixed to their ends to be engaged by the bevel-gears 17 on the top ends of the screws 16, as shown in Fig. 3. It is obvious that by rotating the handle 30 of the shaft 24 all the screws 16 will be rotated at the same time, as required to raise or lower the platform.

The top of the platform 20 has fixed transverse bars 31 for keeping trucks 32 separate on its top. These minor trucks are preferably provided with jointed axles 33 to facilitate moving the trucks and making short turns. Handles 34 on their front ends are adapted to aid in moving them about. Their sides are composed of bars 35, detachably connected with the trucks by means of eye-bolts 36 and hooks 37 or in any suitable way, as required for opening and closing the sides of the trucks for placing and replacing mail-bags, &c., therein.

To connect the platform 20 with a car, extensions 38 are hinged or otherwise adjustably connected with the platform 20, as shown in Fig. 1, or with a car, as shown in Fig. 2, in such a manner that when they are in a horizontal position the minor trucks can be moved direct from the truck 20 into a car, or vice versa.

Having thus set forth the purpose of my invention and the construction, arrangement, and combination of all the parts, the practical utility and operation thereof will be readily understood by railroad men and others familiar with transferring mail-bags, &c., to and from cars.

What I claim as new, and desire to secure by Letters Patent, is—

1. A four-wheeled truck having tubular standards fixed to the end portions of the axles and provided with internal screws in their top portions, frames adapted to be fixed to the corner portions of the bottom of a platform and provided with sleeves adapted to be placed on the tubular standards, screws seated in the tubular standards and means for rotating said screws simultaneously, arranged and combined to operate in the manner set forth for the purposes stated.

2. A four-wheeled truck having tubular standards fixed to the end portions of the axles and provided with internal screws in their top portions, frames adapted to be fixed to the corner portions of the bottom of a platform and provided with sleeves adapted to be placed on the tubular standards, screws seated in the tubular standards, means for rotating said screws simultaneously, comprising bevel gear-wheels fixed to the tops of said screws in the tubular standards, a shaft in bearings at the front portion of the bottom of the platform and bevel-gears fixed to its ends to engage the bevel-gears on the top of said screws and means for rotating the shaft, arranged and combined to operate in the manner set forth for the purposes stated.

3. A four-wheeled truck having tubular standards fixed to the end portions of the axles and provided with internal screws in their top portions, frames adapted to be fixed to the corner portions of the bottom of a platform and provided with sleeves adapted to be placed on the tubular standards, screws seated in the tubular standards, means for rotating said screws simultaneously, comprising bevel gear-wheels fixed to the tops of said screws in the tubular standards, a shaft in bearings at the front portion of the bottom of the platform and bevel-gears fixed to its ends to engage the bevel-gears on the tops of said screws, a rotatable shaft, in right-angled position to said shaft, provided with a worm and a gear-wheel on the first-mentioned shaft engaged by said worm, arranged and combined to operate in the manner set forth for the purposes stated.

FRANK E. BAKER.

Witnesses:
L. L. LEIBROCK,
THOMAS G. ORWIG.